United States Patent [19]

Eubanks et al.

[11] Patent Number: 4,459,734
[45] Date of Patent: Jul. 17, 1984

[54] METHOD OF MAKING FRUIT STORAGE BIN

[75] Inventors: Robert H. Eubanks, Leesburg; Robert W. Blankenship, Ocoee, both of Fla.

[73] Assignee: Williams Steel Industries, Inc., Clermont, Fla.

[21] Appl. No.: 356,201

[22] Filed: Mar. 8, 1982

[51] Int. Cl.³ ...................... B21D 39/00; B23P 19/04
[52] U.S. Cl. ............................ 29/455 R; 29/156.8 R; 29/526 R; 193/12
[58] Field of Search .......... 29/526 R, 156.8 R, 455 R; 193/12

[56] References Cited

U.S. PATENT DOCUMENTS

| | | | |
|---|---|---|---|
| 798,622 | 9/1905 | Pollock | 193/12 UX |
| 803,119 | 10/1905 | Logan | 193/12 X |
| 840,354 | 1/1907 | Lyle | 193/12 UX |
| 1,016,568 | 2/1912 | Landes | 193/12 UX |
| 1,256,724 | 2/1918 | Pardee | 193/12 |
| 3,083,015 | 3/1963 | Barenholtz et al. | 193/12 X |

Primary Examiner—Charlie T. Moon

Attorney, Agent, or Firm—William M. Hobby, III

[57] ABSTRACT

A fruit storage bin apparatus for temporary storage of fruit has a frame wall, a floor and a ceiling forming an enclosure. An inlet is provided in the upper part of the enclosure and an outlet is provided through the walls in the lower part of the enclosure, while the floor is at a raised position relative to ground level. A center column member is mounted between the floor and the ceiling and has a plurality of support arms attached thereto in predetermined positions to support a fiberglass reinforced polymer chute. The chute is made up of sections connected together and to the support arms for lowering the fruit to the floor level, where it is temporarily stored. The method of making a fruit storage bin for the temporary storage of fruit provides for building a framework, attaching a floor and ceiling to the framework, and then attaching a center column between the floor and ceiling. The support arms are of a predetermined shape and attached in predetermined positions along the center column. Chute sections are attached to the support arms as the support arms are being put on to assure proper positioning of the support arms around the center column.

5 Claims, 8 Drawing Figures

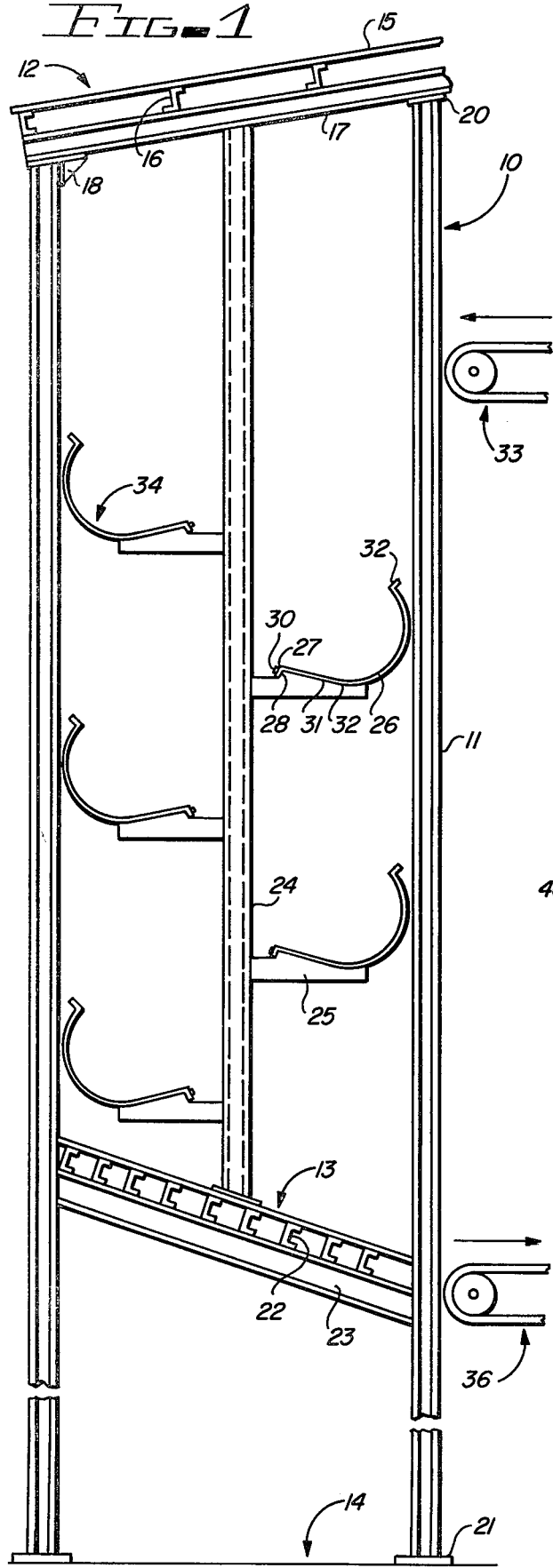
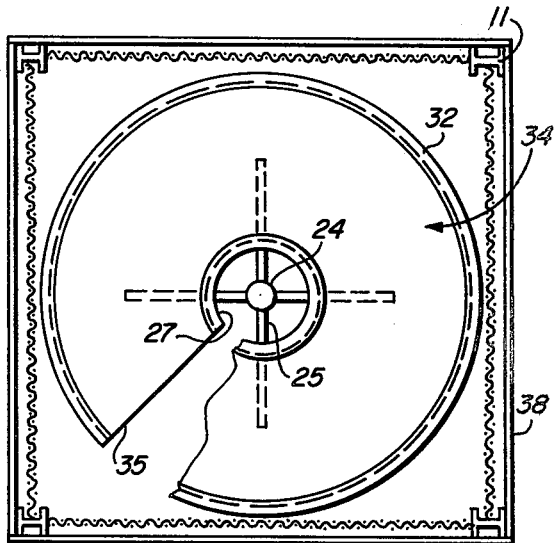
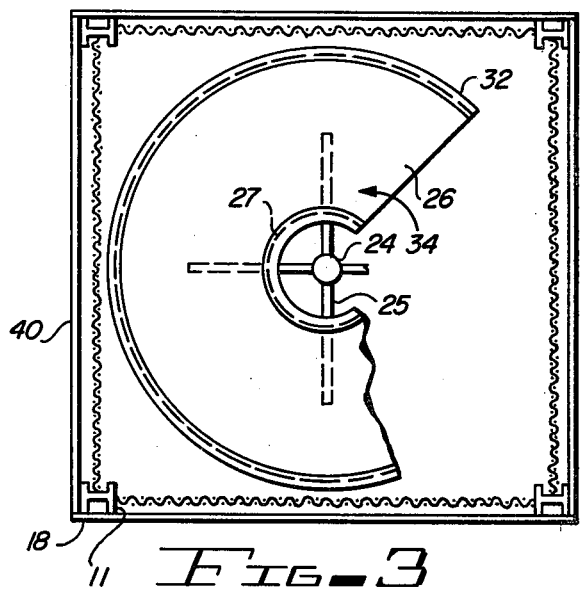
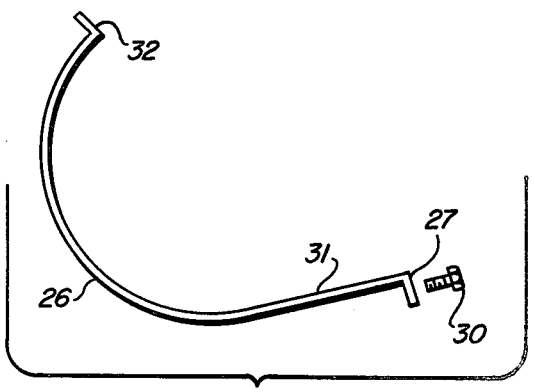

METHOD OF MAKING FRUIT STORAGE BIN

BACKGROUND OF THE INVENTION

The present invention relates to fruit storage bins for the temporary storage of fruit and to a method of making a fruit storage bin for the temporary storage of fruit.

In the processing of certain fruits, such as citrus fruits, the fruit is removed from a truck onto conveyor belts or chutes where it may be processed and cleaned. A citrus processing plant may be processing fruit from different groves or owners which follow each other onto the unloading position one after the other. In order to maintain the fruit from each grove separate, the fruit is fed by conveyors into a temporary storage bin so that the fruit from each grove may be stored in one or more separate bins. Fruit being fed into the storage bin is lowered to the bottom of the bin and in a manner to avoid damage to the fruit. When the fruit is ready for processing, it is fed from the storage bin by gravity onto another conveyor where it is fed for further processing. Prior fruit storage bins are typically fabricated to lower the fruit within the bin by a plurality of baffles or ramps which drop the fruit from one baffle to the next until it gets to the bottom of the bin.

A typical gravity conveyor may be seen in the Ross, et al., U.S. Pat. No. 3,640,366 in which the fruit is dropped through a plurality of offset barriers and tumbles to the bottom where it is collected in a storage bin. A more typical storage bin for citrus fruit may be seen in the Livingston U.S. Pat. No. 3,738,507 which feeds the fruit from one level to the next, where it is stored for a gravity feed out the outlet onto a conveyor. In U.S. Pat. No. 3,601,949 to Slusher, an apparatus and method for filling cartons with fruit is provided in which a rotating auger collects the fruit. In U.S. Pat. No. 3,590,981 a fruit lowering box is provided with energy absorbing baffles for dropping the fruit from one layer to the next and into a storage bin.

The present invention advantageously provides a fruit storage bin which can be manufactured from steel structural members, but having a fiber reinforced polymer chute helically wound around a center support to a bottom angled floor, where it can then be fed from the fruit storage bin onto another conveyor belt. The present fruit storage bin can be easily manufactured from conventional materials, except for the support arms and chute sections which are, however, identical thereby reducing the number of custom made components.

SUMMARY OF THE INVENTION

The present invention relates to a fruit storage bin for temporary storage of fruit and to a method of making a fruit storage bin for temporary storage of fruit.

The fruit storage bin has structural members forming a framework supporting a floor and a ceiling and walls having an inlet and outlet therethrough. A center column member is mounted between the floor and ceiling and has a plurality of chute support arms atached thereto in predetermined positions along the center column. Fiberglass reinforced polymer chute sections are shaped for attachment to the support arms and to each other to form a spiral chute around a center column member for lowering the fruit from the inlet to the floor. The floor is at an angle positioned to allow the fruit to be gravity fed onto a conveyor out the outlet. The method of making a fruit storage bin for temporary storage of fruit includes building a framework and attaching a floor and a ceiling to the framework. The center column is then attached between the floor and ceiling and the support arms are attached such as by welding to the center support column in predetermined positions, which may be aligned individually as each chute section is attached to the arms to form a helical chute around the center column to the angled floor.

BRIEF DESCRIPTION OF THE DRAWINGS

Other objects, features and advantages of the present invention will be apparent from the written description and the drawings, in which:

FIG. 1 is a sectional view of a fruit storage bin in accordance with the present invention having the conveyors positioned adjacent thereto;

FIG. 2 is a sectional view taken through the bottom portion of the fruit storage bin of FIG. 1;

FIG. 3 is a sectional view taken through the top portion of the conveyor of the fruit storage bin of FIG. 1;

FIG. 4 is a sectional view taken through a conveyor chute section;

DESCRIPTION OF THE PREFERRED EMBODIMENTS

Figure 5:
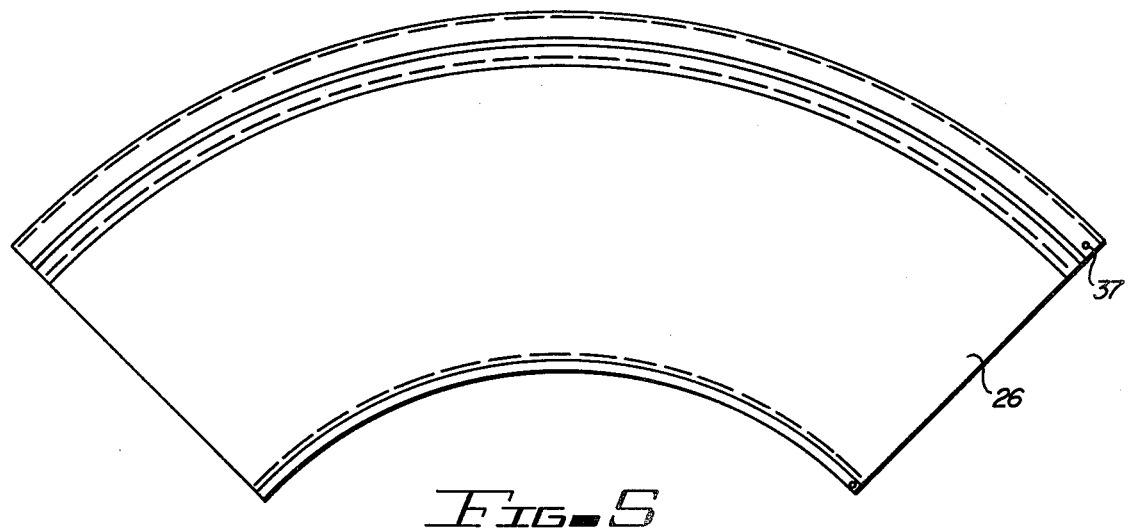
FIG. 5 is an elevation of a conveyor chute section.

Referring to FIGS. 1 through 6 of the drawings, a fruit storage bin 10 for the temporary storage of fruit is shown having support columns 11 having a roof 12 attached thereto and a floor 13 attached above the ground level 14. The roof section can have a conventional roof 15 supported by steel rafters 16 which in turn are supported by beams 17. A small portion of one of the walls 18 is shown adjacent thereto. The columns 11 have upper flanges 20 and lower flanges 21 for attaching the columns to the ground level and to the ceiling beams 17. The floor 13 is supported by floor joists riding on beams 23. A center column 24 is mounted between the floor of 13 and the ceiling 12. The column 24 has a plurality of support arms 25 welded or otherwise attached to the column in predetermined positions around the column. The arms 25 may be placed in 90° angles around the column 24 as shown in FIGS. 2 and 3, each one stepped down from the previous arm on the column 24. A plurality of fiberglass reinforced polymer chute segments 26 are each curved to follow a helical pattern around the column 24. When connected, each chute segment 26 has a lip flange 27 for fitting onto a ledge 28 on the support arm 25. The chute 26 is bolted with a bolt 30 to the arm 25 on the ledge 28 and has a portion 31 resting on the surface 29 of the arm 25. The chute 26 forms a generally arcuate pattern having a lip flange 32 formed on the other edge thereof. Each chute segment, as shown in FIG. 5, is not only bolted to arms 25, but are connected to each other with bolts or other fasteners as desired to form one rigid helical chute starting at a raised position in the fruit bin 10 and proceeding down near the floor 13. A conveyor 33 brings the fruit to a raised position in the fruit bin 10 through an opening in the wall thereto and dumps the fruit onto the helical chute 34, where it follows a helical pattern around the chute until it gets to the end of the chute 35 where it drops onto the angled floor 13. The fruit accumulates on the floor 13, as well as backing up the chute 34, where it is stored until it is ready to be processed further. When it is ready to be processed, the gate can be opened to dump the fruit by gravity onto a conveyor 36 which delivers the fruit to the processing plant.

Figure 6:
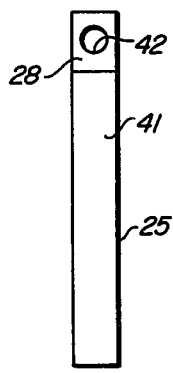
FIG. 6 is an end view of a support arm prior to attachment to the center column.

FIGS. 4 and 5 show additional details of the chute portion 26 having openings 37 therein for attaching one chute section to the next. In FIG. 2, the walls 18 can be seen having an outlet opening 38; while in FIG. 3, the walls can be seen as having in inlet opening 40. In FIG. 6, arm 25 is shown having a portion 41 which is welded to the column 24 of FIG. 1, and a ledge 28 having a threaded opening 42 therein for the bolt 30.

Figure 7:
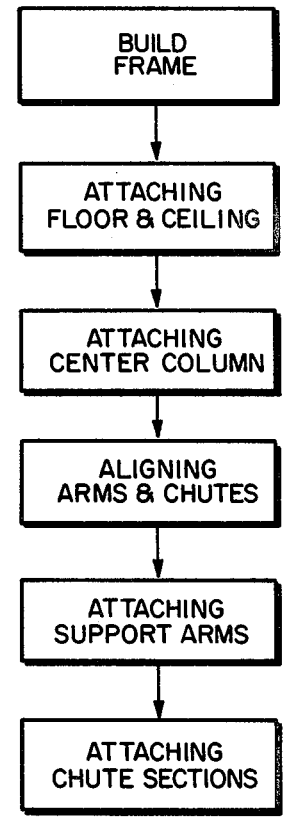
FIG. 7 is a flow diagram of the process in accordance with the present invention.

FIG. 7 shows a flow diagram for the making of a fruit storage bin for the temporary storage of fruit in accordance with FIGS. 1 through 6. The first step is the building of a frame with the columns 11 and the floor and ceiling beams and attaching the floor and ceiling. The center column 24 can then be attached between the floor 13 and the ceiling 12 and the arms and chutes can be aligned by attaching the first arm, setting a chute in place to position the next arm and attaching the next arm and setting another chute in place to position the next arm until the entire arms and chutes are attached to form a helical passageway around the center column 24. The arms can be welded while the chutes are bolted with bolts 30 and are attached to each other to give a rigid, spiral structure which will not damage the fruit.

Figure 8:
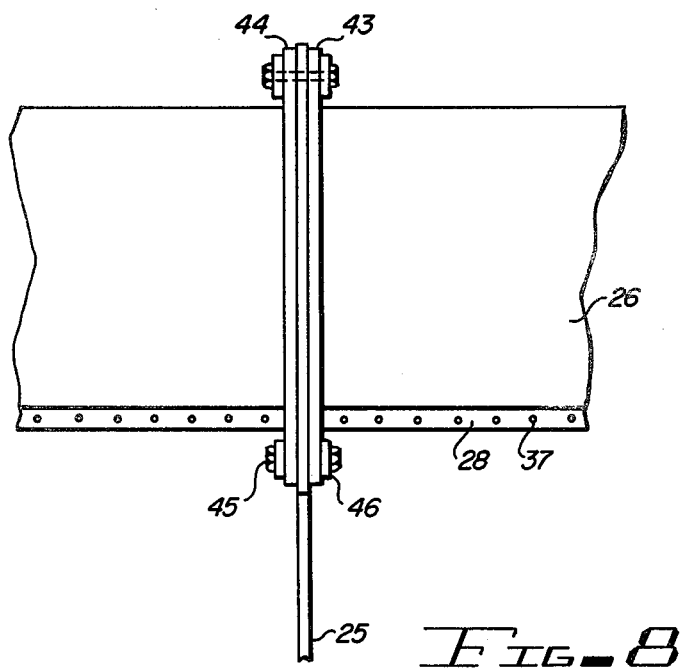
FIG. 8 is a bottom elevation of an alternate embodiment of support arms for a fruit storage bin.

FIG. 8 shows a bottom elevation of an alternate embodiment of support arms for use with the fruit storage bin in accordance with FIGS. 1 through 6. The arm 25 in this embodiment has a pair of steel back up strips 43 and 44 bolted thereto with bolts 45 and form flanges 46 for the trough 26. The trough 26 still has a flanged lip 28 and openings 37 for attaching thereto.

The fruit storage bin can advantageously be built in a manufacturing plant and shipped to the site for installation at the fruit processing plant.

It should be clear at this point that a method of making a fruit storage bin and a fruit storage bin for the temporary storage of fruit has been shown. However, the invention is not to be considered as limited to the forms shown, which are to be considered illustrative rather than restrictive.

I claim:

1. A method of making a fruit storage bin for temporary storage of fruit comprising the steps of:
   building a framework;
   attaching a floor and ceiling to said framework;
   attaching a center column between said floor and ceiling;
   forming arcuate chute sections of fiberglass having an arcuate lip formed on two edges and a plurality of apertures in one lip of each chute section;
   forming flat support arms of a predetermined shape having an attaching edge and a lip thereon and a chute support edge shaped to support a chute section;
   aligning each support arm with a chute section prior to attaching each support arm in a predetermined position;
   attaching support arms of predetermined shape in predetermined positions along said center column; and
   bolting chute section arcuate lips to said arm lips to form a helical chute around said center column.

2. A method in accordance with claim 1, including the step of attaching wall sections to said framework, said wall sections having an inlet and an outlet to said fruit storage bin.

3. A method in accordance with claim 2, in which the step of attaching support arms to said center columns includes welding said support arms to said center column.

4. A method in accordance with claim 3, in which the step of attaching chute sections to said support arms includes positioning a chute section lip flange on a ledge formed on each arm and bolting said chute section through said lip flange into the ledge on said arm.

5. A method in accordance with claim 4, in which the step of attaching a floor to said framework includes attaching said floor above the ground level at an angle for directing fruit to the outlet of said fruit storage bin.

* * * * *